UNITED STATES PATENT OFFICE.

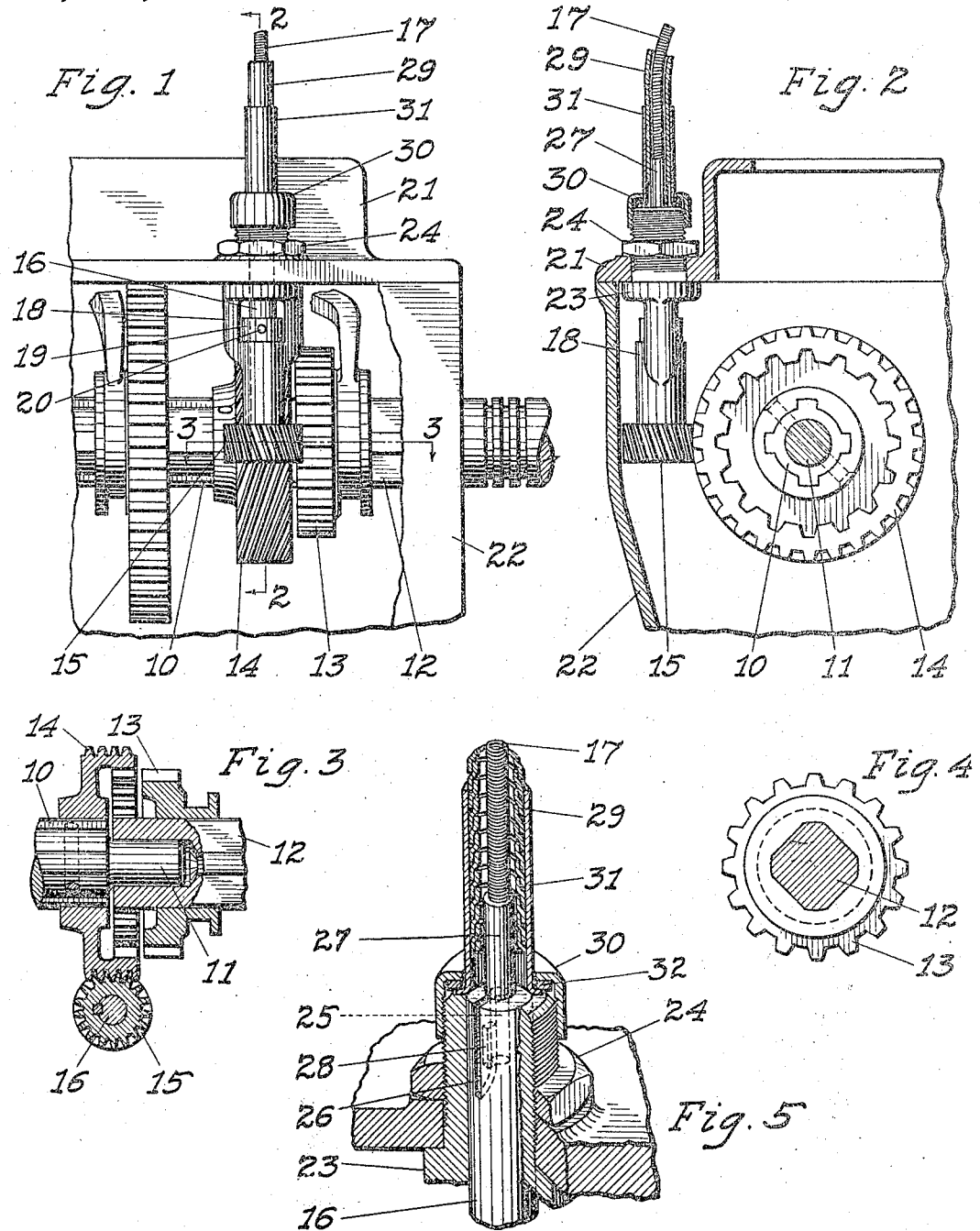

HORACE E. DODGE, OF GROSSE POINTE, MICHIGAN, ASSIGNOR TO DODGE BROTHERS, OF DETROIT, MICHIGAN, A CORPORATION OF MICHIGAN.

SPEEDOMETER DRIVING MECHANISM.

1,242,660.  Specification of Letters Patent.  Patented Oct. 9, 1917.

Application filed June 20, 1916. Serial No. 104,705.

*To all whom it may concern:*

Be it known that I, HORACE E. DODGE, a citizen of the United States, residing at Grosse Pointe, Michigan, have invented certain new and useful Improvements in Speedometer Driving Mechanisms, of which the following is a clear, full, and exact description.

This invention relates to mechanism for driving speedometers or odometers, or the combined speed and distance indicating devices such as are used on motor vehicles. For convenience, the term "speedometer" will be used hereinafter to indicate any of the various types of such devices with which the invention may be employed.

One of the objects of the invention is to provide a simple speedometer driving mechanism, the moving parts of which are entirely inclosed and thus protected from the action of water, mud, dust, etc., and are at the same time automatically lubricated without attention from the operator. Another object is to provide a speedometer driving mechanism which is simple and cheap to manufacture and which can be made to operate satisfactorily even though no means for adjusting are provided. Another object is to provide a speedometer drive which is positively connected to the driven part of the power transmitting mechanism of a motor vehicle so that its speed will bear a constant relation to the speed of the vehicle. Still another object is to provide a speedometer driving mechanism which can be assembled or taken apart easily and which is so arranged that it does not add to the labor of assembling or taking apart the parts adjacent to it, an important feature of the invention being the connection of the speedometer driving mechanism to the removable cover of the transmission gear case of a motor vehicle in such manner that all parts of said mechanism which are not integral with the transmission gearing may be removed by the mere removal of said cover.

These being among the objects of the present invention, the same consists of certain features of construction and combinations of parts to be hereinafter described and then claimed with reference to the accompanying drawings, which illustrate a suitable embodiment of the invention having the above and other objects in view. In the drawings Figure 1 is an elevation partly in section showing a portion of a motor vehicle transmission with a speedometer drive embodying the present invention in place;

Fig. 2 is a transverse section through the transmission on the line 2—2 of Fig. 1;

Fig. 3 is a horizontal section on the line 3—3 of Fig. 1;

Fig. 4 is a view showing the sliding gear on the drving shaft of the transmission.

Fig. 5 is a perspective view, partly in section showing the upper portion of the speedometer driving mechanism in detail.

Referring to Figs. 1 and 3, the driven shaft 10 of the transmission is provided at its forward end with a reduced cylindrical portion 11 which fits a corresponding cylindrical hole in the rear end of the driving shaft 12 so that the two shafts, while mutually supporting each other, are free to rotate relatively. On the driving shaft is mounted the gear 13 which is arranged to rotate with said shaft and to slide longitudinally thereon. On the front end of the driven shaft the internally toothed gear 14 is fixedly mounted. By sliding the gear 13 toward the rear, it may be engaged with the internally toothed gear 14, the two gears thus forming a clutch for connecting the driving and driven shafts whenever this is desired. When such connection is made, the torque of the motor is transmitted directly to the driven shaft, but when the gears 13 and 14 are separated, the motor torque may be transmitted from the driving shaft to the driven shaft by using various combinations of gears not shown in the drawing, these gears being of such relative sizes as to give the desired ratios between the speeds of the driving and driven shafts.

The gear 14 being mounted so as to rotate with the driven shaft 10 which is directly connected through the propeller shaft and rear axle to the driving wheels of the car, always rotates at a speed proportional to that of the driving wheels. It is consequently used in the present invention to form a portion of a mechanism for driving a speedometer and is preferably provided with helical teeth upon its outer circumference. With these teeth are engaged suitably formed teeth upon the pinion 15, the number and angle of the teeth on the gear 14 and the pinion 15 being calculated to give the proper speed to the pinion shaft 16 which is directly connected to the flexible shaft 17 of a speedometer. The shaft 16 has the pinion 15 rigidly mounted on its lower end and is carried in the support 18, which consists of two bearings integrally connected and having an open space between them. In this open space a thrust collar 19 is fitted to the shaft and is held in place by the pin 20. This collar prevents longitudinal movement of the shaft downward, while the pinion being in contact with the lower end of the lower bearing, prevents an upward movement. The upper part of the support passes through an opening in the cover 21 of the transmission case 22 and is provided with a shoulder 23 which bears against the lower side of the cover. The upper end of the support is threaded and carries the nut 24, which may be screwed down tightly so that the cover is pinched between the nut and the shoulder and the support held in a fixed position.

Connection to the flexible shaft of the speedometer may be made as shown in Fig. 5. The end of the shaft 16 has a central hole 25 and a slot 26 communicating with it so as to form a suitably shaped opening for receiving the terminal 27 of the flexible shaft 17. This terminal consists of a cylindrical part centered on the flexible shaft and provided with a lateral lug 28 which engages with the slot 26. The flexible shaft 17 is surrounded by a casing 29 which is attached securely to the upper end of the support 18 by the nut 30. This nut is screwed on the bearing and is also in engagement with the flange of the sleeve 31 on the end of the shaft casing, a washer or gasket 32 being placed between the nut and flange so that the casing is securely connected to the support 18 and the moving parts are thoroughly protected from dirt or water.

By using helical teeth on the gears 13 and 14 and by arranging the various parts as shown, it is possible to remove the cover without separating it from the support 18 or any of the other parts of the speedometer driving mechanism which are not integral with the transmission. When the cover is lifted, the tangential motion of the pinion 15 relative to the gear 14 causes the pinion to rotate as the teeth separate, but as the shaft 16 is free to revolve, this does not interfere with the operation. In assembling the parts, the action is the same but in the reverse direction.

It is obvious that the invention is susceptible of modification, as parts may be omitted, parts added, and parts substituted without departing from the spirit and scope of the invention as expressed in the claims.

What I claim as new is:—

1. In a motor vehicle, the combination with the transmission mechanism of said vehicle, comprising driving and driven members, and a lubricant containing casing inclosing said mechanism, of a speedometer shaft rising from the upper side of said casing, and means depending within said casing from said side for connecting said shaft to said transmission mechanism.

2. In a motor vehicle, the combination with the transmission mechanism of said vehicle, comprising driving and driven members and a lubricant containing casing inclosing said mechanism, of a speedometer driving shaft, and means, comprising a pinion engaging a side of one of said members, for connecting said shaft to said mechanism, a pinion shaft and bearings therefor, said pinion, pinion shaft and bearings being wholly carried by one side of said casing.

3. In a motor vehicle, the combination with the transmission mechanism of said vehicle, comprising driving and driven members, and a lubricant containing casing inclosing said transmission mechanism, of a speedometer driving shaft, and means for connecting said shaft to said transmission mechanism, comprising a pinion turning about a substantially vertical axis and supporting bearings therefor, said bearings being carried by the upper wall of said casing.

4. In a motor vehicle, the combination with the transmission mechanism of said vehicle, comprising driving and driven members turning about horizontal axes, and a lubricant containing casing inclosing said mechanism, of a speedometer driving shaft, and means, comprising a pinion engaging a side of one of said members, for connecting said shaft to said mechanism, a pinion shaft and bearings therefor, said casing having a removable part by which said pinion, pinion shaft and bearings are carried.

5. In a motor vehicle, in combination with the transmission mechanism of said vehicle comprising driven and driving clutch members, a speedometer driving-shaft, and means for operatively connecting said shaft to the driven clutch member.

6. In a motor vehicle, in combination with the transmission mechanism of said vehicle, and a casing for said mechanism having a removable cover, a speedometer driving-shaft, and means for connecting said shaft to said transmission mechanism, said means extending through and being carried by the cover of said transmission casing.

7. In a motor vehicle, in combination with the transmission mechanism of said vehicle, comprising a driven shaft and a driving shaft, and means for connecting said shafts, said driven shaft being normally connected to a vehicle wheel whereby its speed of rotation bears a constant ratio to the speed of the vehicle, a casing for said mechanism having a removable cover, and speedometer driving means carried by said cover and movable bodily with said cover into and out of operative driving relation to said driven shaft.

8. In a motor vehicle, in combination with the transmission mechanism of said vehicle, comprising driven and driving clutch members, said driven clutch member being normally connected to a vehicle wheel whereby its speed of rotation bears a constant ratio to the speed of the vehicle, a speedometer driving shaft, and means for connecting said shaft to said transmission mechanism, said means comprising a gear carried by said driven clutch member.

9. In a transmission mechanism, alined driving and driven shafts, an internally toothed gear acting as a clutch member and mounted on said driven shaft and provided with helical teeth on its periphery, a coöperating clutch member connected to said driving shaft, a second gear provided with helical teeth and engaged with the helical teeth of said first mentioned gear, and a shaft on which said second gear is mounted, said shaft being adapted to drive a speed indicating device.

10. In a transmission mechanism, a case, a driven shaft in said case, a cover on said case, a bearing carried by said cover, a shaft supported in said bearing, a pinion carried by said shaft, a gear mounted on said driven shaft and meshing with said pinion, a speed indicator shaft and means for connecting said pinion shaft to said speed indicator shaft.

11. In a transmission mechanism, a case, a gear in said case, a removable cover for said case, a shaft passing through said cover, a bearing for said shaft supported on said cover, and a pinion fixed on said shaft and meshed with said gear, said pinion, pinion shaft and bearing being removable as a unit with said cover.

12. In a transmission mechanism, a case, alined driving and driven shafts in said case, an internally toothed gear mounted on said driven shaft and forming one member of a clutch for connecting said driving and driven shafts, said internal gear having external helical teeth formed on the periphery thereof, a pinion provided with helical teeth meshed with the external teeth of said gear, a shaft carrying said pinion, said pinion shaft being provided at one end with means for connecting it to the shaft of a speed indicating device, a bearing supporting said pinion shaft, a removable cover on said case, said cover having an opening through which said pinion shaft passes, and means for retaining said bearing in a fixed position relative to said cover.

13. In a transmission mechanism, a case, alined driving and driven shafts in said case, an internally toothed gear mounted on said driven shaft and forming one member of a clutch for connecting said driving and driven shafts, said internal gear having external helical teeth formed on the periphery thereof, a pinion provided with helical teeth meshed with the external teeth of said gear, a shaft carrying said pinion, said pinion shaft being provided at one end with means for connecting it to the shaft of a speed indicating device, a bearing supporting said pinion shaft, a removable cover on said case, said cover having an opening through which said pinion shaft passes, and means for retaining said bearing in a fixed position relative to said cover, said pinion, pinion shaft and bearing being so arranged as to be removable from said transmission case as a unit with said cover.

14. In a motor vehicle, the combination with the transmission mechanism of said vehicle, comprising a driven shaft having normal connections whereby its speed bears a definite ratio to the speed of the vehicle, a power-operated driving shaft, and means for selectively connecting said driving shaft to said driven shaft to operate the latter at a selected predetermined speed ratio to the former, of a speedometer driving shaft, means for operatively connecting said speedometer driving shaft to said driven shaft, and a lubricant containing casing inclosing all the said connecting means and by a removable part of which casing said speedometer shaft connection is carried.

15. In a motor vehicle, the combination with the transmission mechanism of said vehicle, comprising a gear provided with helical teeth, and a casing for said mechanism having a removable cover, of a speedometer driving shaft, and means for connecting said shaft to said transmission mechanism comprising a second helical gear carried by said cover and movable therewith into and out of tangential relation to said first-mentioned helical gear.

Signed at Detroit, Mich., this 13th day of June, 1916.

HORACE E. DODGE.

Witnesses:
ALFRED H. KNIGHT,
A. A. McPHERSON.